(12) United States Patent
Hirsch

(10) Patent No.: US 10,227,767 B2
(45) Date of Patent: Mar. 12, 2019

(54) FLEXIBLE CHECK VALVE FOR FLUID CONTROL

(71) Applicant: Tide Stop LLC, Johns Island, SC (US)

(72) Inventor: Steven Michael Hirsch, Johns Island, SC (US)

(73) Assignee: Tide Stop LLC, Johns Island, SC (US)

( * ) Notice: Subject to any disclaimer, the term of this patent is extended or adjusted under 35 U.S.C. 154(b) by 0 days.

(21) Appl. No.: 15/873,954

(22) Filed: Jan. 18, 2018

(65) Prior Publication Data

US 2018/0230686 A1  Aug. 16, 2018

Related U.S. Application Data

(60) Provisional application No. 62/457,381, filed on Feb. 10, 2017.

(51) Int. Cl.
| | |
|---|---|
| *E03F 5/04* | (2006.01) |
| *F16K 15/14* | (2006.01) |
| *E03F 5/042* | (2006.01) |
| *E03F 7/04* | (2006.01) |
| *F16K 15/16* | (2006.01) |
| *F04B 53/10* | (2006.01) |

(52) U.S. Cl.
CPC ............ *E03F 5/0411* (2013.01); *E03F 5/042* (2013.01); *E03F 7/04* (2013.01); *F16K 15/147* (2013.01); *F16K 15/16* (2013.01); *F04B 53/1047* (2013.01)

(58) Field of Classification Search
CPC . E03F 5/0411; E03F 5/042; E03F 7/04; F16K 15/147; F16K 15/16; F04B 53/1047
See application file for complete search history.

(56) References Cited

U.S. PATENT DOCUMENTS

| | | |
|---|---|---|
| 2,913,000 A | 11/1959 | Roberts |
| 4,172,580 A | 10/1979 | Raftis et al. |
| 4,492,253 A | 1/1985 | Raftis |
| 4,585,031 A | 4/1986 | Raftis et al. |
| 4,607,663 A | 8/1986 | Raftis et al. |
| 5,044,396 A | 9/1991 | Daudet et al. |
| 56,061,995 | 3/1997 | Raftis |

(Continued)

FOREIGN PATENT DOCUMENTS

| | | |
|---|---|---|
| DE | 4031456 A1 | 4/1992 |
| EP | 1077339 A2 | 2/2001 |

*Primary Examiner* — Kevin Lee
*Assistant Examiner* — P. Macade Nichols
(74) *Attorney, Agent, or Firm* — Jeffrey T. Stover; Haynsworth Sinkler Boyd, P.A.

(57) ABSTRACT

A flexible check valve for fluid-handling systems that prevents reverse flow but allows downstream flow of fluid comprises a dome that fits within a pipe and includes a concave surface. The flexible check valve further includes a flexible seat that fits within the pipe and includes a. convex surface. The flexible seat is deformable from a closed position, that prevents reverse flow, to an open position, that allows downstream flow, when an upstream pressure acts on the flexible seat and exceeds a downstream pressure and when, in the closed position, the concave surface of the dome is oriented downstream and the convex surface of the flexible seat is oriented upstream. A housing is connected to the dome and the flexible seat and is connectable to the pipe. A seal is formed between the concave surface and the convex surface when the flexible check valve is in the closed position.

20 Claims, 8 Drawing Sheets

(56) References Cited

U.S. PATENT DOCUMENTS

| | | |
|---|---|---|
| 5,769,125 A | 6/1998 | Duer et al. |
| 5,931,197 A | 8/1999 | Raftis et al. |
| 6,412,514 B1 | 7/2002 | Raftis |
| 6,561,225 B2 | 5/2003 | Raftis |
| 6,585,005 B1 | 7/2003 | Raftis et al. |
| 6,953,059 B2 | 10/2005 | Raftis |
| 9,010,363 B2 | 4/2015 | Huber |
| 2004/0003846 A1* | 1/2004 | Seidl .................... F16H 57/027 137/493 |
| 2005/0175490 A1 | 8/2005 | Seto et al. |
| 2014/0060673 A1* | 3/2014 | Lyons .................. F16K 15/031 137/527.8 |

\* cited by examiner

FLEXIBLE CHECK VALVE FOR FLUID CONTROL

REFERENCE TO RELATED APPLICATIONS

This application claims priority to U.S. Provisional Patent Application No. 62/457,381 flied on Feb. 10, 2017, the entire counts of said provisional application being incorporated herein by reference.

BACKGROUND

The need to prevent reverse flow exists in many different fluid-handling systems. For example, stormwater infrastructure systems along the coast and/or near bodies of water frequently experience changes in water levels in the environment to which the stormwater is discharged as a result of, for instance, tidal influences, which may cause reverse flow from the environment into the stormwater systems. As shown by environment 100 in FIG. 1A (prior art), when the environmental water level is low or normal, stormwater and/or other fluids, associated with a stormwater system, may flow into environmental waters vias pipe 110 associated with the stormwater system. As shown by environment 100 in FIG. 1B (prior art), when the water level is high, environmental water can enter the stormwater pipe and flow backwards into the stormwater system If the tide is high enough, tide water can inundate the stormwater system and cause overflow and flooding into roadways and other areas that normally drain into to the stormwater systems.

To combat this issue, stormwater systems sometimes use a valve (hereinafter, "conventional valve") to prevent backflow of tidal water or other environmental water (e.g., rivers, lakes, streams, reservoirs, etc.) (hereinafter, sometimes referred to as "environmental water") at high water levels, hut such conventional valves (e.g. duckbill valves, conventional check valves, etc.) often become clogged with debris and trash causing the conventional valve to malfunction (e.g., shown as "clogged valve" in FIG. 1B). When such conventional valves become clogged, they are not able to prevent stormwater from flowing backwards into and inundating the stormwater system. Additionally, some conventional valves require a manufactured mounting assembly in order to attach the valve to an existing pipe, which makes installation challenging and adds additional costs. Further, the size and weight of such conventional valves make in-situ installation difficult. Accordingly, there is a need in the stormwater management and other industries for an effective and easy-to-install check valve that resists clogging and which limits and/or prevents backflow during high environmental water levels. Additionally, or alternatively, many other fluid-handling systems may benefit from an effective and easy-to-install check valve.

SUMMARY

According to an implementation, described herein, a flexible check valve that prevents a reverse flow in a fluid-handling system but allows a downstream flow of fluid through the fluid-handling system includes a dome that fits within a pipe of the fluid-handling system, the dome including a concave surface. The flexible check valve further includes a flexible seat that fits within the pipe and that includes a convex surface, the flexible seat being deformable from a closed position, that prevents the reverse flow, to an open position, that allows the downstream flow of fluid through the fluid-handling system. The flexible seat deforms to the open position when an upstream pressure in the pipe acts on the flexible seat and exceeds a downstream pressure and when, in the closed position, the concave surface of the dome is oriented downstream and the convex surface of the flexible seat is oriented upstream. The flexible check valve further includes a housing that is connected to the dome and the flexible seat, the housing being connectable to the pipe. The flexible check valve further includes a seal formable between the concave surface of the dome and the convex surface of the flexible seat, the seal being formed when the flexible check valve is in the closed position to prevent the reverse flow. The dome may be deformable from a dome closed position to a dome open position when the upstream pressure exceeds the downstream pressure. Alternatively, the dome may be rigid. The dome may include a rim that prevents an edge of flexible seat from extending beyond the rim. The dome may include a second convex surface, opposite the concave surface, and the flexible seat may include a second concave surface opposite the convex surface. The housing may include a flange and/or an expandable clamp. The housing, the dome and the flexible seat may be formed from a single piece of material.

According to another implementation, described herein, a flexible check valve that prevents a reverse flow in a fluid-handling system but allows a downstream flow of fluid through the fluid-handling system includes a dome that fits within a pipe of the fluid-handling system, the pipe including a concave surface and a first base portion. The flexible check valve further includes a flexible seat that fits within the pipe and that includes a convex surface. The flexible seat is deformable along a flexible gradient from a closed position, that prevents reverse flow, to an open position, that allows the downstream flow of fluid through the fluid-handling system, when an upstream pressure acts on the flexible seat and exceeds a downstream pressure and when in the closed position, the concave surface of the dome faces downstream and the convex surface of the flexible seat faces upstream. The flexible gradient is located between a second base portion and an edge of the flexible seat. The flexible check valve further includes a housing that fits within the pipe and is connected to the dome proximate the first base portion and the flexible seat proximate the second base portion. The flexible check valve further includes a seal formable between the concave surface of the dome and the convex surface of the flexible seat. The seal is formed when the flexible check valve is in the closed position to prevent the reverse flow. The dome may be deformable from a dome closed position to a dome open position when the upstream pressure exceeds the downstream pressure. Alternatively, the dome may be rigid. The flexible seat may be more flexible at the edge than at the second base portion. Alternatively, the flexible seat may be more flexible at the second base portion than at the edge.

According to another implementation, described herein, a flexible check valve that prevents a reverse flow in a stormwater system but allows a drainage of stormwater through the stormwater system includes a dome that fits within a pipe of the stormwater system. The dome includes a first concave surface, a first convex surface opposite the first concave surface, and a first base portion. The flexible check valve further includes a flexible seat that fits within the pipe and that includes a second concave surface, a second convex surface opposite the second concave surface, and a second base portion. The flexible seat is deformable from a closed position, that prevents reverse flow, to an open position, that allows the drainage of stormwater through the stormwater system, when a upstream pressure in the pipe acts on the second convex surface of the flexible seat and exceeds a downstream pressure and when, in the closed position, the concave surface of the dome is oriented downstream and the convex surface of the flexible seat is oriented upstream. The flexible check valve further includes a housing that fits within the pipe and is connected to the dome proximate the first base portion and connected to the flexible seat proximate the second base portion. The flexible check valve further includes a seal formable between overlapping portions of the first concave surface of the dome and the second convex surface of the flexible seat. The seal is formed when the flexible check valve is in the closed position to prevent the reverse flow. The dome may be rigid. Alternatively, the dome may be deformable from a dome closed position to a dome open position when the upstream pressure exceeds the downstream pressure. The housing may be connectable to an expansion clamp. The housing may include a flange. The flange may fit within the pipe and include a landing for an expansion clamp.

DETAILED DESCRIPTION

Figure 1A:
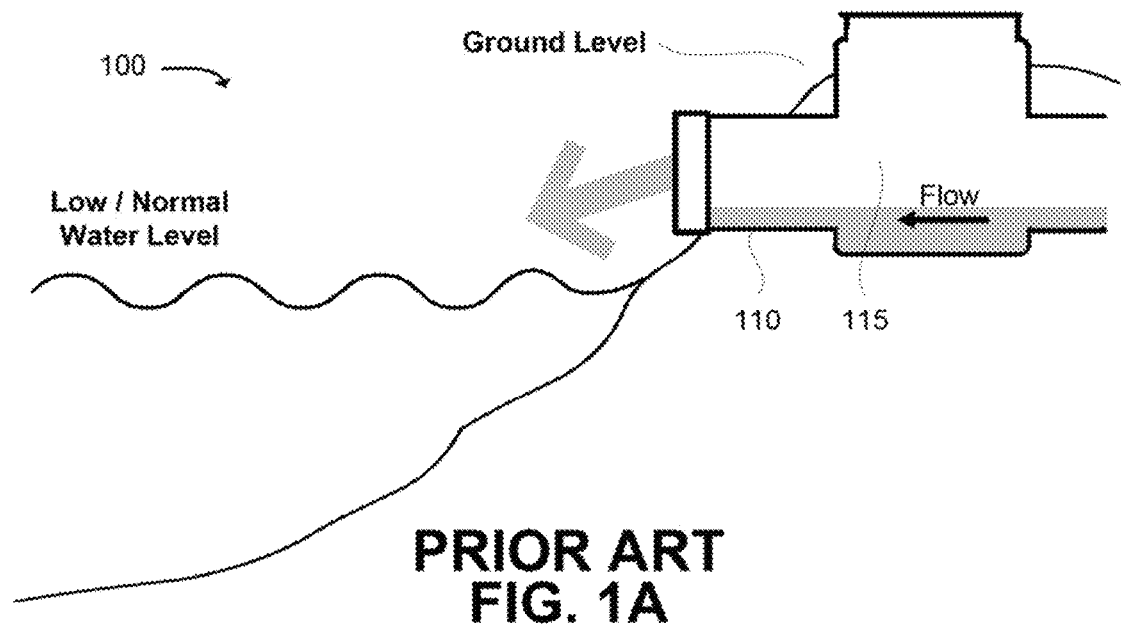
FIGS. 1A and 1B depict example environments that include conventional valves that are known in the art.
Figure 1B:
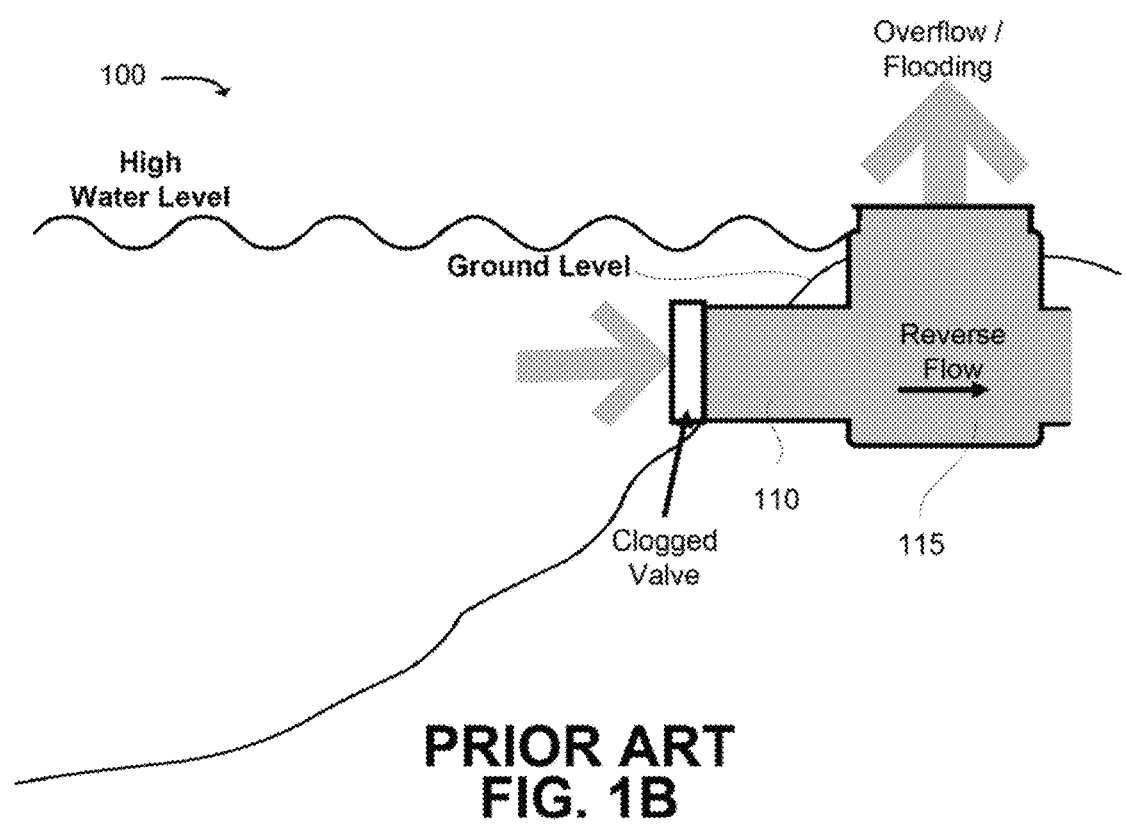

FIGS. 1A-4C are attached hereto and incorporated herein by reference. The following detailed description refers to the accompanying FIGS. 1A-4C. The same reference numbers in different figures may identify the same or similar elements.

The device, systems, methods, technologies and/or techniques described herein may include a flexible check valve that controls the flow of water and/or other fluids within a pipe associated with a fluid-handling system, such as a stormwater system, a water system, a sewage system, an agricultural system, a hydraulic system, a pneumatic system, a refrigeration system, an industrial system (e.g., for handling water, chemicals, and/or other fluids), etc. The device, systems, methods, technologies and/or techniques are described below in connection with a stormwater system that drains stormwater into environmental waters for simplicity and explanatory purposes, but implementation thereof need not be so limited. Additionally, or alternatively, in other embodiments and/or implementations, the devices, systems, methods, technologies and/or techniques may be used in connection with any water or fluid system. Thus, references to "stormwater" are representative of any type of fluid used in any system (e.g. fluid associated with rivers, lakes, streams, reservoirs, holding ponds, industrial processes, etc.; fluid associated with hydraulic systems, pneumatic systems, refrigeration system, industrial processes, etc.).

The flexible check valve may include a dome component and a flexible seat component that are each connected to a housing. The flexible check valve may be connected to an end of or within a pipe associated with a fluid-handling system. For example with respect to stormwater systems, the flexible check valve may control the flow of stormwater in and/or out of the pipe by operating on differential pressure in a manner to be described in greater detail below. As the stormwater level rises within the stormwater pipe on the upstream end of the flexible check valve, the pressure, due to the water within the pipe, may exert a force and/or pressure on the upstream side flexible check valve. In this disclosure, "upstream" refers to the direction from which stormwater flows in the system (i.e. stormwater flows from upstream to a discharge into, for instance, environmental waters). Further, "downstream" refers to the direction of the discharge and is opposite the upstream direction. When the upstream pressure ("P1"), due to the stormwater within the pipe, is greater than downstream pressure ("P2") associated with pressure from the reverse flow direction, including pressure from the environmental water level (i.e. the pressure of the environment into which the stormwater is to be discharged) from reverse flow (P1>P2), the flexible seat component may flex, deform and/or fold back (collectively, "deform"), due to the upstream pressure acting on the flexible seat, which may cause a loss of seal and/or an opening to form between the flexible seat component and the dome component. Such loss of seal or opening may allow stormwater to flow downstream through the pipe, through the flexible check valve (e.g., between the dome component and flexible seat component, through the housing) and to drain into the environment. The first pressure is usually greater than the second pressure when the environmental water level is at low or normal levels and when water within the pipe creates the upstream pressure P1 above ambient pressure.

However, as the environmental water level rises on the downstream side of the valve (such as during tidal events or other high water levels, increased water current, high tide, storm surge, wind-driven water events, flooding, etc.), the downstream pressure P2 may increase to a level that is equal to or greater than the upstream pressure P1, which may cause the flexible seat component and dome component to form seal, causing the opening to close (the "closed position"). In the closed position, the flexible check valve may prevent environmental water from entering the stormwater pipe (hereinafter referred to as "reverse flow") via the flexible check valve. Preventing reverse flow, via the flexible check valve, may prevent the stormwater system from being inundated with environmental water. Preventing such inundation may avert overflow and/or flooding from the stormwater system. Additionally, or alternatively, the design of the flexible seat component and the dome component may limit and/or prevent trash and/or debris from becoming entangled, stuck or clogging the flexible check valve.

The flexible check valve may be installed onto the end of, and/or within, a pipe or similar structure associated with fluid-handling system. The flexible check valve may include a housing to which the flexible seat component and/or dome components are connected. The housing may include a flange that allows the flexible check valve to be attached to the end of a pipe, between two pipes, and/or within a pipe in a manner that provides a water-tight seal. Additionally, or alternatively, the flexible check valve may be connected to a pipe without the need for a flange. For example, the flexible check valve may be connected to the inside of a pipe by, for instance, using an expansion clamp on an inside surface of the housing. The expansion clamp may be adjusted (e.g. turning a threaded expansion screw, etc.) to expand the expansion clamp to press the housing against the inner diameter of the pipe to keep the flexible check valve in place and to form a water-tight seal between the flexible check valve and the pipe.

Figure 2A:
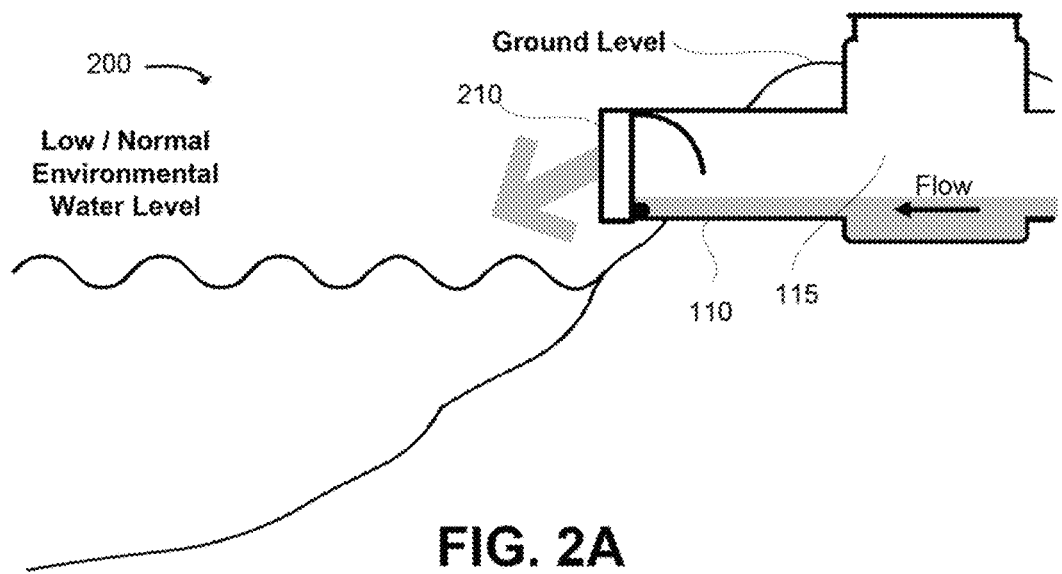
FIGS. 2A-2D depict example environments in which the device, systems, methods, technologies and/or techniques, described herein, may be implemented.
Figure 2B:
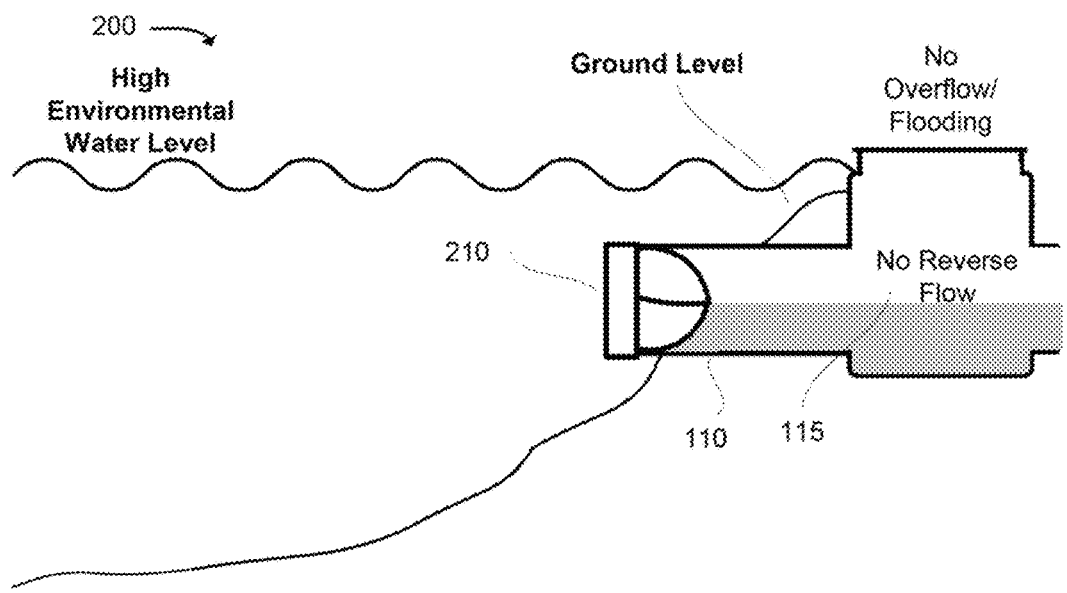

FIG. 2A-2D depict example environment 200 in which the flexible check valve 210, described herein, may be implemented. As shown in FIGS. 2A and 2B, environment 200 may include pipe 110 (e.g. a pipe, culvert, etc. that may be placed in a stormwater system), associated with a stormwater system, and flexible check valve device 210 (hereinafter, "valve 210"). Valve 210 may be attached to an end of pipe 110 to prevent intrusion of debris, pests, animals, etc. and/or to control the flow of stormwater into the environmental water during low and/or normal water level. Additionally, or alternatively, valve 210 may restrict or prevent the backflow of environmental water into pipe 110 during high water levels (e.g., due to rising or high tides, storm surge, flooding, increasing water currents, etc.), which may prevent the inundation or overflow of the stormwater system.

As will be described in greater detail below, valve 210 may generally exist in an "open state" or a "closed state" depending on conditions such as environmental water level, environmental water currents, the rate of outflow from pipe 110, etc. For example, when there is no outflow from pipe 110 and/or the water level is low or normal level, valve 210 may be in the closed state, which may prevent intrusion into pipe 110 by debris, insects, varmints, etc. In a non-limiting example, the default state of valve 210 may be the closed state.

Additionally, or alternatively, when the environmental water level is at a low and/or normal level and there is outflow from pipe 110, as depicted in FIG. 2A, valve 210 may be in an "open state" in this example, valve 210 may transition to the open state when static and/or dynamic forces and/or pressures, exerted on the upstream side (the right side in FIGS. 2A and 2B) of valve 210 due to the outflow, is greater than static and/or dynamic forces and/or pressures exerted on the downstream side of valve 210 by environmental water. As shown in FIG. 2A, the open state may enable stormwater to flow from the stormwater system, via pipe 110, into the environmental water via valve 210 in the open state.

Additionally, or alternatively, when the environmental water is at a high level, as depicted in FIG. 2B, valve 210 may be in the closed state. In this example, valve 210 may transition to the closed state when static and/or dynamic threes and/or pressures, exerted on the upstream side of valve 210 due to the outflow, are not greater than static and/or dynamic forces and/or pressures exerted on the downstream side of valve 210 by environmental water. The closed state may prevent environmental water from backflowing into pipe 110 and/or the stormwater system via valve 210.

Figure 2C:
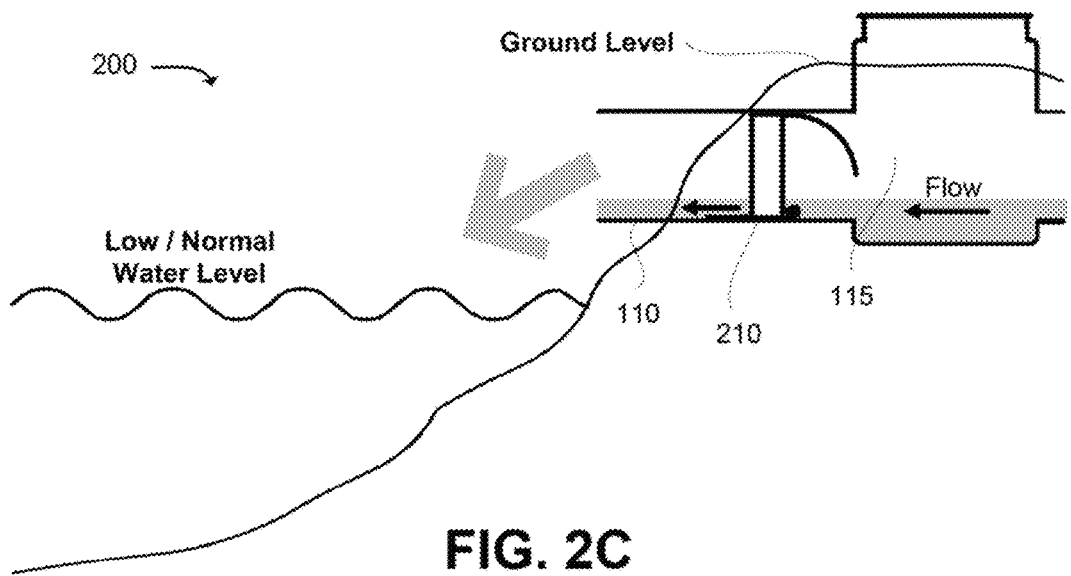
Figure 2D:
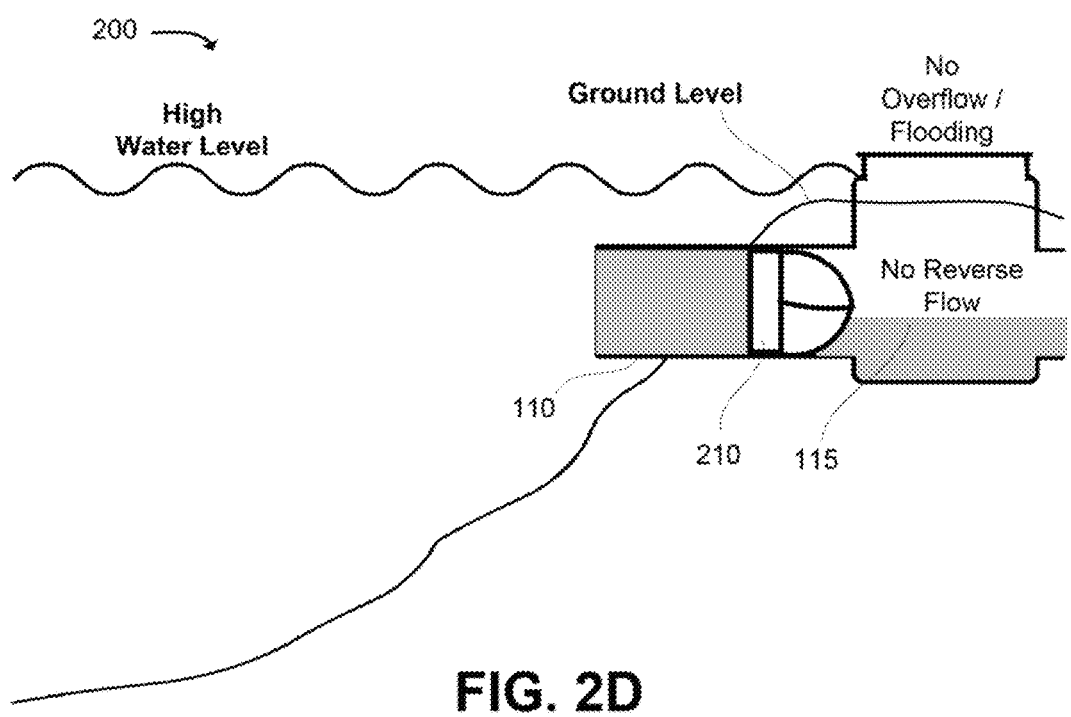

As shown in FIGS. 2C and 2D, environment 200 may include pipe 110, associated with a stormwater system, and valve 210 within pipe 110 to control the flow of stormwater fact the environmental water during low and/or normal water level in a manner similar to that described above with respect to FIG. 2A. Additionally, or alternatively, valve 210 may, in a manner similar to that described above with respect to FIG. 2B, prevent or restrict the backflow of environmental water into the stormwater system, via pipe 110, during high environmental water levels (e.g., due to rising or high tides, storm surge, flooding, increasing water currents, etc.), which may prevent the inundation or overflow of the stormwater system.

The valves, devices and/or components of environment 200, as illustrated in FIGS. 2A-2D, are provided for explanatory purposes only, but the scope of the disclosure herein is not limited to the embodiments provided in these figures. In other implementations, there may be additional valves, devices and/or components; fewer valves, devices and/or components; different valves, devices and/or components; or differently arranged valves, devices and/or components than illustrated in FIGS. 2A-2D. Also, in some implementations, one or more of the valves, devices and/or components of FIGS. 2A-2D may perform one or more functions described as being performed by another one or more of the valves, devices and/or components of FIGS. 2A-2D.

Figure 3A:
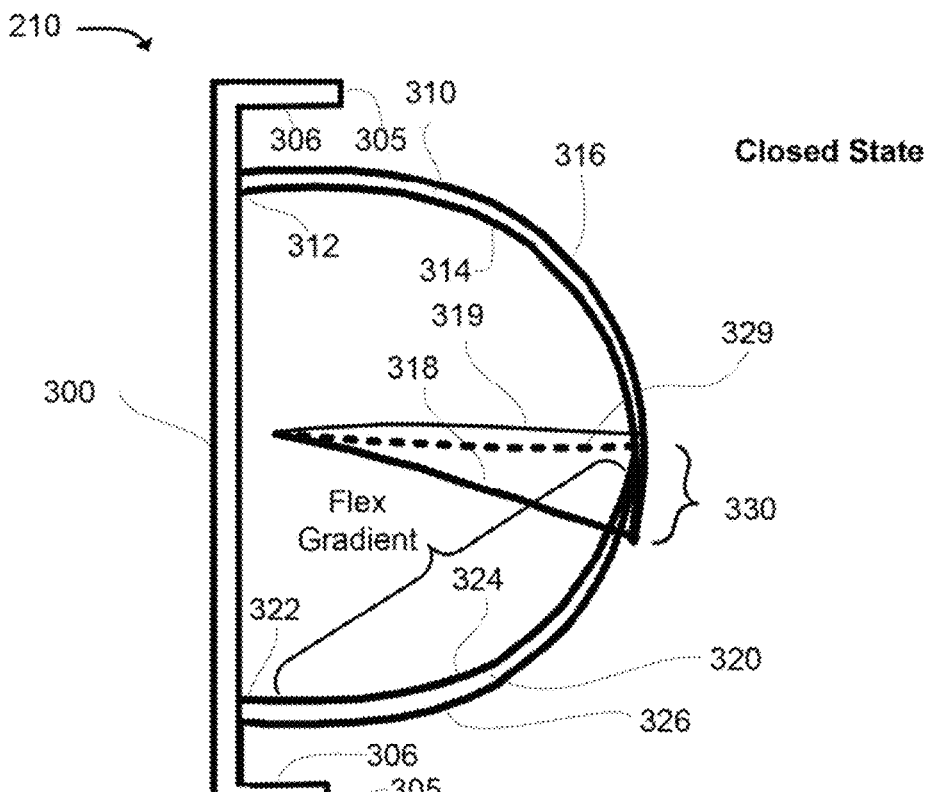
FIGS. 3A-3D illustrates a diagram of example components that may correspond to the flexible check valve of FIGS. 2A-2D.
Figure 3B:
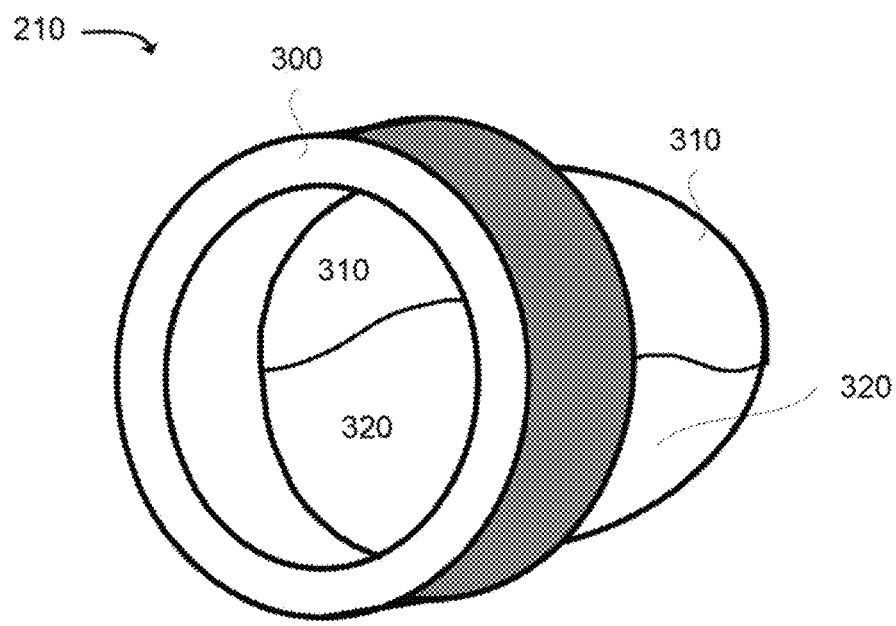
Figure 3C:
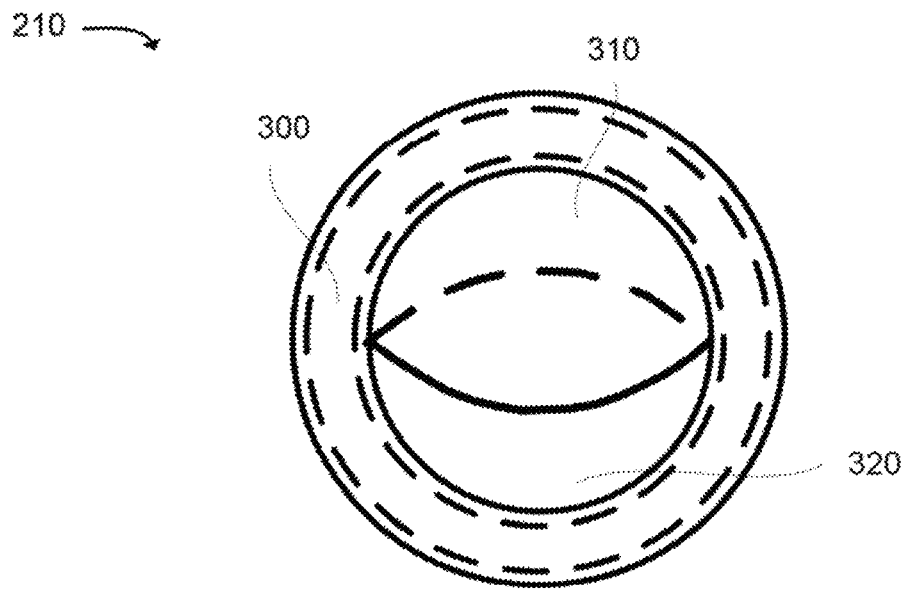
Figure 3D:
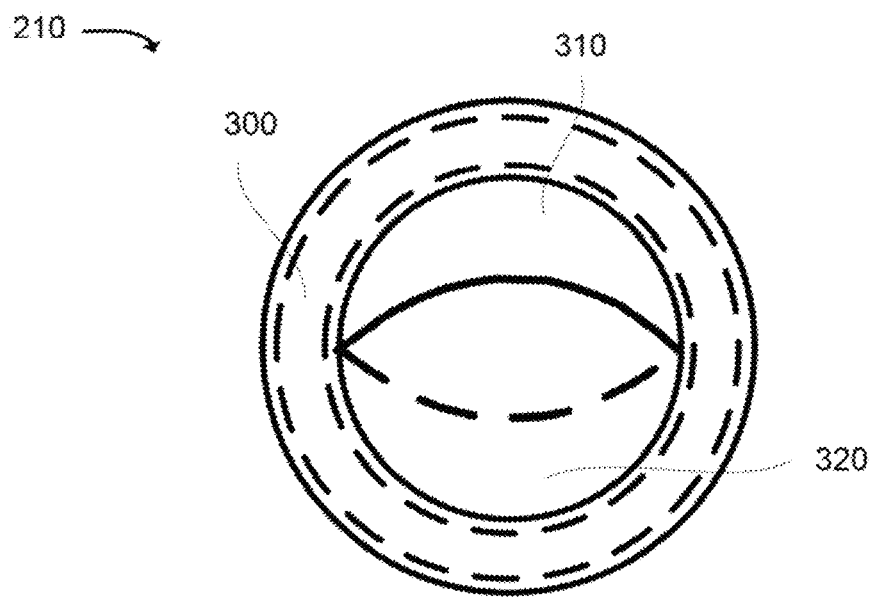

FIGS. 3A-3D illustrates a diagram of example components that may correspond to valve 210. FIG. 3A is a cross-sectional view of valve 210 that identifies components of valve 210 including housing 300, dome 310, and/or flexible seat 320. FIG. 3B is an isometric view of valve 210 viewed from a downstream perspective. FIG. 3C is a planform view of valve 210 viewed longitudinally from an upstream perspective. FIG. 3D is a planform view of valve 210 viewed longitudinally from a downstream perspective.

As shown in FIGS. 3A and 3B, housing 300 may form a housing and/or chassis to which dome 310 and/or flexible seat 320 may be attached and which may connect valve 210 to au end of pipe 110 and/or within pipe 110. Housing 300 may be formed by a material of sufficient strength and rigidity to support the static and dynamic forces imparted on housing 300 by stormwater, environmental water, dome 310 and/or seat 320, such as, for example, when environmental water levels are low, high, transitioning between low and high levels and/or when flow rates of stormwater from pipe 110 are low, high or transitioning between low and high flow rates. High flow rates may occur when flow rates are greater than fifty percent of the flow capacity of pipe 110. Such materials may include one or more of concrete, a polymer, rubber, a composite material (e.g., fiberglass, graphite composite, etc.), a ceramic material, metal (e.g., alloys associated with steel, stainless steel, aluminum, iron, etc.), etc. Housing 300 may be formed from one or more pieces of material and/or may be formed from the same piece of material as dome 310 and/or flexible seat 320.

Housing 300 may be formed in a size and shape that corresponds to the size and/or shape of pipe 110. For example, housing 300 may include a dimension that allows housing 300, dome 310 and/or flexible seat 320 to be attached to and/or fit within the interior of pipe 110 in a manner that forms a water tight seal between housing 300 and pipe 110. For example, when valve 210 is configured to fit within pipe 110 (e.g., in a manner described with respect to FIGS. 2C and 2D), housing 300 may be formed of a shape and/or dimension that allows housing 300 to make contact with and/or form a water-tight seal between housing 300 and the inner surface of pipe 110. In one non-limiting example, if pipe 110 is cylindrical, then housing 300 may include an external surface that corresponds to a cylinder with an outer diameter that makes contact with and/or fits within the inner diameter of pipe 110 such that, when valve 210 is installed in the pipe 110, a water-tight fit exists between housing 300 and pipe 110. Housing 300 may be located inside of the inner diameter of pipe 110 and may be connected to pipe 110, such as by using an expansion clamp. Housing 300 may be hollow to allow stormwater to flow through housing 300 and into the environment when valve 210 is in an open state. Additionally, or alternatively, dome 310 and/or flexible seat 320 may be formed of a semi-circular shape with a radius that enables dome 310 and/or flexible seat 320 to fit within pipe 110. If pipe 110 includes an elliptical, rectangular, or some other cross section, the cross section and/or dimensions of housing 300, dome 310, and/or flexible seat 320 may correspond to that of pipe 110 or any other shape that enables housing 300, dome 310, and/or flexible seat 320 to fit within and/or take contact with pipe 110 in a manner that forms a water tight seal between housing 300 and pipe 110.

Additionally, or alternatively, housing 300 may include a flange 305 that is attached to and/or is formed as a part of housing 300. Flange 305 may conform to a shape and/or dimension that corresponds to pipe 110 in a manner allows valve 210 to be attached to and/or form a rater tight seal with an end of pipe 110 and/or within pipe 110. In a non-limiting example, flange 305 may be formed of a shape and dimension that corresponds to the end of pipe 110 and/or an outer surface of pipe 110 (e.g., in a manner similar to that described above with respect to FIGS. 2A and 2B and below with respect to FIGS. 4B) to enable flange 305 to form a water tight seal with the end of pipe 110, between two pipes 110, or with outer surface of pipe 110 when housing 300 is inserted into pipe 110. In another non-limiting example embodiment, flange 305 may include an expansion clamp surface 306 on which an expansion clamp is placed when flange 305 is located within pipe 110 (i.e. when an expansion clamp presses against the expansion clamp surface to form a water-tight seal between flange and the inner diameter of pipe 110).

Housing 300 may be formed with or without flange 305. If housing does not include flange 305, housing 300 may be inserted within pipe 110 based on a pressure fit that uses friction to remain fixed to pipe 110 and/or is attached to pipe 110 with a mechanical fastener (e.g., bolt, rivet, etc.), an expansion clamp, or industrial adhesive. Housing 300 may be formed from a single piece of material. Additionally, or alternatively, housing may be formed from more than piece of material that is joined (e.g. welded, fastened, etc.) together or that is not joined until installation in pipe. For example, and not Limitation, housing may include a first component associated with (e.g. connected to, attached to, connectable to, etc.) dome 310 and a second component associated with flexible seat 320. The first component and second component may form the housing when valve is installed in a pipe (e.g. such as when an expansion valve secures first component and second component in place, etc.). First and second component may touch and/or overlap on both sides of each when installed in a pipe such that there are no gaps between first component and second component when the valve is installed in the pipe, which may form a water tight seal between first component and second component, first component and pipe, and second component and pipe.

Dome 310 may be formed of an impermeable material of sufficient rigidity and strength (e.g., metal, concrete, composite, a polymer, etc.) to withstand upstream pressure imparted from fluid flowing from pipe 110 (including the pressure transferred to dome 310 via seal with flexible seat 320), downstream pressure imparted by, for example, stationary or moving environmental water at low and/or high water levels, and/or the differential pressure between the upstream pressure and downstream pressure. Additionally, or alternatively, dome 310 may be formed of a material or materials that allow dome 310 to deform in the same manner as flexible seat 320 to allow stormwater to pass through pipe 110 but is sufficiently strong to support a seal between dome 310 and flexible seat 320 in the event of a reverse flow event. Dome 310 may be formed from a material or materials of sufficient inertness and/or corrosion resistance to withstand exposure to a variety of fluids and environmental conditions (e.g. wet and dry conditions, contaminants, chemicals, hydraulic fluid, solvents, industrial agents, salt water, etc.). Dome 310 may include a first base 312 that is attached to a first portion of the perimeter of housing 300. Dome 310 may include a first concave surface 314 that is exposed and/or oriented downstream towards the environmental water (i.e. the first concave surface 314 faces downstream, in the direction of out flow, when the dome 310 is in the closed position and/or undeformed) and a first convex surface 316 opposite the first concave surface 314, that is exposed and/or oriented upstream within pipe 110 (i.e the first convex surf ice 316 faces upstream, opposite the direction of stormwater outflow, when the dome 310 is in the closed position and/or undeformed). The first concave 314 and convex surfaces 316 may form a semi-hemispherical portion of dome 310 having a complex curvature that loosely resembles the upper beak of a bird. Semi-hemispherical portion of dome may be rigid such that dome 310 does not deform. Additionally, or alternatively, semi-hemispherical portion may be flexible and may deform to allow additional fluid (i.e. more than when only flexible seat 320 deforms) to pass through the pipe 110 but may be rigid enough to allow flexible seat 320 to form a seal with dome 310 as further described herein. In this embodiment, dome 310 may deform less than flexible seat 320 so that dome returns to the dosed position before flexible seat to ensure that the dome 310 and flexible seat 320 form a seal. As shown in FIGS. 3A and 3B, dome 310 may extend longitudinally upstream from the housing 300 and may include an edge 318 that extends along some and/or all of the perimeter of the hemispherical portion. In a non-limiting example, the edge 318 may include a rim 319 that is formed by a ridge or depression on the first concave surface in proximity of and/or along all or a portion of the length of the edge (e.g., within 0.1 inches, 0.2 in., 0.5 in., 1 in., 2 in. 6 in., 12, in. etc. of the edge). The rim 319 may be formed by material (e.g., between the ridge and the edge) having a thickness that is less than the hemispherical portion inboard of the rim and/or away from the edge. The portion of dome 310 from edge 318 to rim 319 may provide an overlapping portion 330 of the concave surface 314 on which a portion of flexible seat 320 may make contact to form a water-tight seal. The rim 319 may correspond to an upper limit of the overlapping portion 330. When the rim 319 is formed as a ridge or protrusion, the rim may prevent edge 329 (edge 329 extends along dotted line in FIG. 3A) of flexible seat 320 from extending beyond rim and thereby limit overlap of flexible seat 320 and dome 310.

Flexible seat 320 may be formed of an impermeable material of sufficient strength to withstand upstream pressure imparted from fluid flowing from pipe 110, downstream pressure imparted by, for example, environmental water at low and/or high water levels, and/or the differential pressure between the upstream pressure and downstream pressure. Flexible seat 320 may be formed from a material or materials of sufficient inertness and/or corrosion resistance to withstand exposure to a variety of fluids and environmental conditions (e.g. wet and dry conditions, contaminants, chemicals, hydraulic fluid, solvents, industrial agents, salt water, etc.). Additionally, or alternatively, flexible seat 320 may be formed from a material of sufficient flexibility and toughness to withstand cycling from a closed state to an open state and back again over many times (e.g. hundreds of times, thousands of times, one million times, etc.) during service life of valve 210. For example, but not limitation, flexible seat 320 may be formed from one or more polymers (e.g. a natural rubber, a synthetic polymers, etc.).

Flexible seat 320 may include a second base portion 322 that is attached to a second portion of the perimeter of housing 300. Flexible seat 320 may include a second concave surface 324 that is oriented (when closed) downstream (i.e. towards the direction of desired flow) and a second convex surface 326, opposite the second concave surface 324, that is oriented upstream (when closed). Second convex surface 326 forms a seal with the concave surface 314 of dome 310 between the edge 318 and rim 319 of dome 310. The second concave surface 324 and second convex surface 326 form a second semi-hemispherical portion of flexible seat 320 having a complex curvature that loosely resembles the lower beak of a bird. As shown in FIGS. 3A and 3B, flexible seat 320 may extend longitudinally upstream from the housing 300 and may include dimensions that enable flexible seat 320 to fit snuggly and/or tightly within the concave surface of dome 310 such that a water-tight seal may be formed between them. Flexible seat 320 may include an edge 329 that extends along the perimeter of the second hemispherical portion.

As shown in FIG. 3A, flexible seat 320 may be formed in a manner that creates a flex gradient with a variable amount of elasticity (e.g., variable amount of stiffness and/or resistance to flex) between the second base 322 and the edge 329 of flexible seat 320. The amount of elasticity may be varied by forming flexible seat 320 with a material associated with a Young's Modulus (e.g., "E") that changes as a function of location between the second base 322 and the edge 329 of flexible seat 320. In one non-limiting example, a first amount of elasticity, near the second base 322 is formed by a material with a first Young's Modulus (e,g., "E1"), may be less than a second amount of elasticity in proximity of the edge 329 of flexible seat 320 that is formed of a material with a second Young's Modulus (e.g., "E2") that is less than the first Young's Modulus (e.g., E2<E1). In this example, the flex gradient may enable the second base 322 of flexible seat 320 to remain relatively rigid and/or to resist bending, flexing or deforming, while allowing the second hemispherical portion, from second base 322 to edge 329 of flexible seat 320, to readily bend, flex, and/or deform depending on the forces or pressure imparted on flexible seat 320. For example, in a manner to be described in greater detail below with respect to FIG. 4A, when the downstream pressure is greater than the upstream pressure, flexible seat 320 may bend, flex and/or deform in a manner that cause the edge 329 of flexible seat 320 to make contact with and/or form a water tight seal with a portion of dome approximately between the edge 318 and/or rim 319 of dome 310. The seal is formed when the concave surface 314 of dome 310 faces downstream (for example, toward the stormwater system exit/ environmental water, etc.) and the convex surface 326 of the flexible seat 320 faces upstream, i.e. opposite downstream. The seal may prevent reverse flow in pipe 110. The seal may be formed at some or all of the overlapping portion 330 of dome 310 and flexible seat 320. As downstream pressure P2 increases, the seal may become tighter and/or more (i.e., more than when downstream pressure is lower) of the overlapping portions 330 of dome 310 and flexible seat 320 may come in contact to strengthen the seal. In another non-limiting example, in a manner to be described in greater detail below with respect to FIG. 4A, when the upstream pressure is greater than downstream pressure, flexible seat 320 may bend, flex and/or deform in a manner that causes an opening to form between the edge 329 of flexible seat 320 the dome 310. The opening may cause the seal to be broken and/or allow downstream flow through pipe 110.

Other flex gradients are possible. For example, the amount of elasticity near the second base 322 of flexible seat 320 (e.g., E1) may be greater than the amount of elasticity associated with the second hemispherical portion (e.g., E2, where E2>E1), such that the pressure exerted on flexible seat 320 may cause the base portion 322 to deform more readily than the second hemispherical portion. In this example, the second base portion 322 may deform which may cause the seal or opening to form between dome 310 and flexible seat 320 when the upstream pressure is greater than the downstream pressure. It should be understood that the elasticity of flexible seat 320, and how elasticity varies along second semi-hemispherical portion, may influence where the flexible seat 320 deforms (i.e. at what point between second base 322 and edge 329) and/or how much the flexible seat 320 deforms under a given pressure and/or the size of the opening that is created between dome 310 and flexible seat 320 when upstream pressure exceeds downstream pressure.

Although FIGS. 3A-3D depict example components of valve 210, in other implementations, valve 210 may include fewer components, additional components, different components, or differently arranged components than illustrated in FIGS. 3A-3D. For example, valve 210 may include two or more flexible seats 320. In another example, valve 210 may include two or more flexible seats 320 and no dome 310 or a dome 310 that is formed as a flexible seat 320 but located in the same position as dome 310. When dome 310 is allowed to deform in the manner similar to flexible seat 320, then housing and/or the connection between flexible seat 320 and dome 310 may cause dome 310 to return to the closed position prior to and/or concurrently with flexible seat 320 such that dome 310 remains upstream of flexible seat 320 to ensure that a seal may be formed between the convex surface 326 of flexible seat 320 and the concave surface 314 of dome 310 (between rim and edge as shown in 3A). In yet other implementations, one or more components of valve 210 may perform one or more tasks described as being performed by one or more other components of valve 210. FIGS. 3A-3D illustrate valve 210 based on installations having a certain orientation and/or angle for explanatory purposes. Additionally, or alternatively, valve 210 may be at a different orientations and/or angles (e.g., rotated in a clockwise or counterclockwise angle ±10, 20, 30, 60, 90, 180, etc. degrees) relative to that which is illustrated in FIGS. 3A-3D. Installing flexible seat 320 along a lower surface of pipe 110 may maximize the flow of stormwater through valve 210. Additionally, while the housing 300, dome 310 and flexible seat 320 may be formed from different materials, two or more of housing 300, dome 310 and flexible seat 320 may be formed from the same piece of material. Additionally, or alternatively, housing 300, dome 310 and/or flexible seat 320 may be connected using, for instance, adhesives, mechanical fasteners, welding, heat sealing, etc.

Figure 4A:
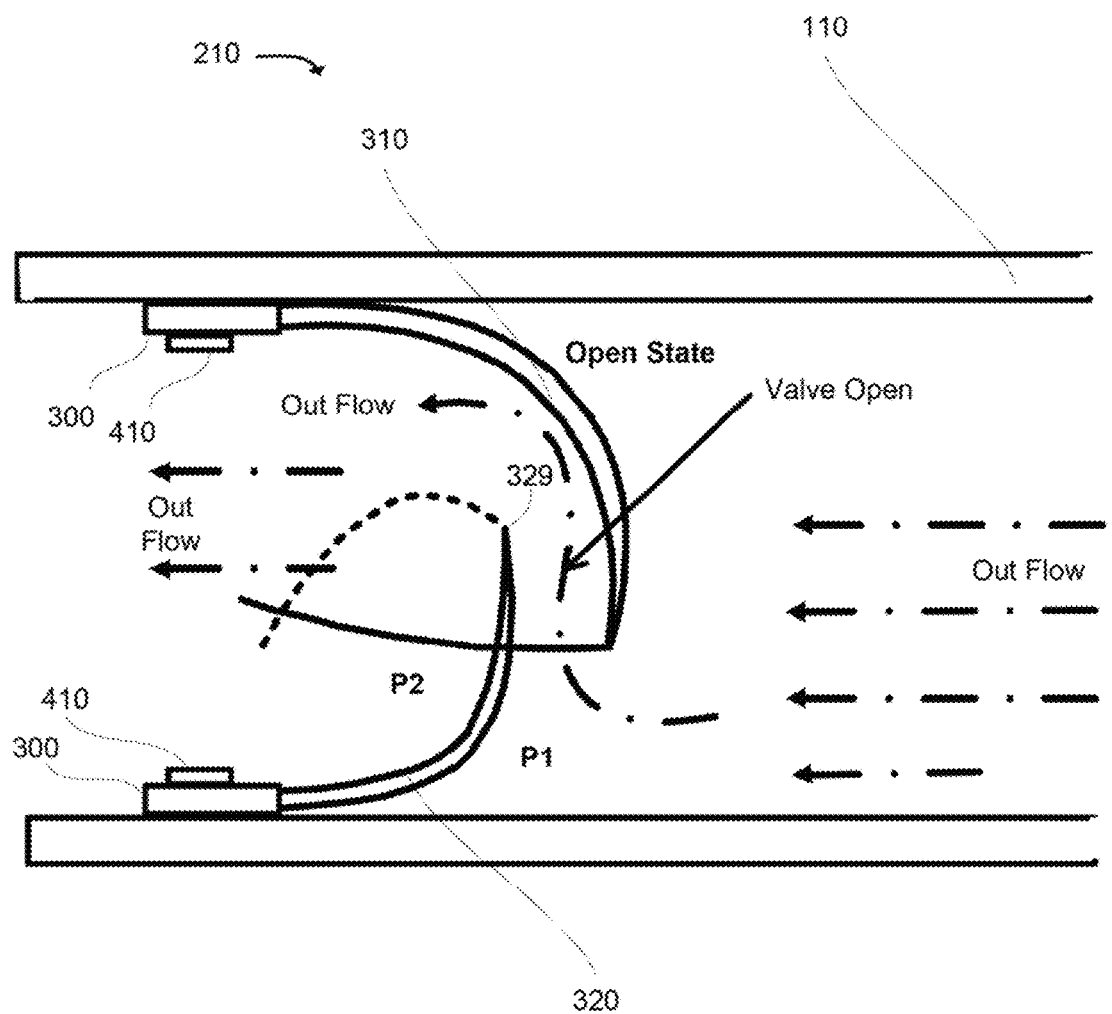
FIGS. 4A-4C illustrate examples of how the check valve of FIGS. 2A-3D may function based on changes in environmental water level.
Figure 4B:
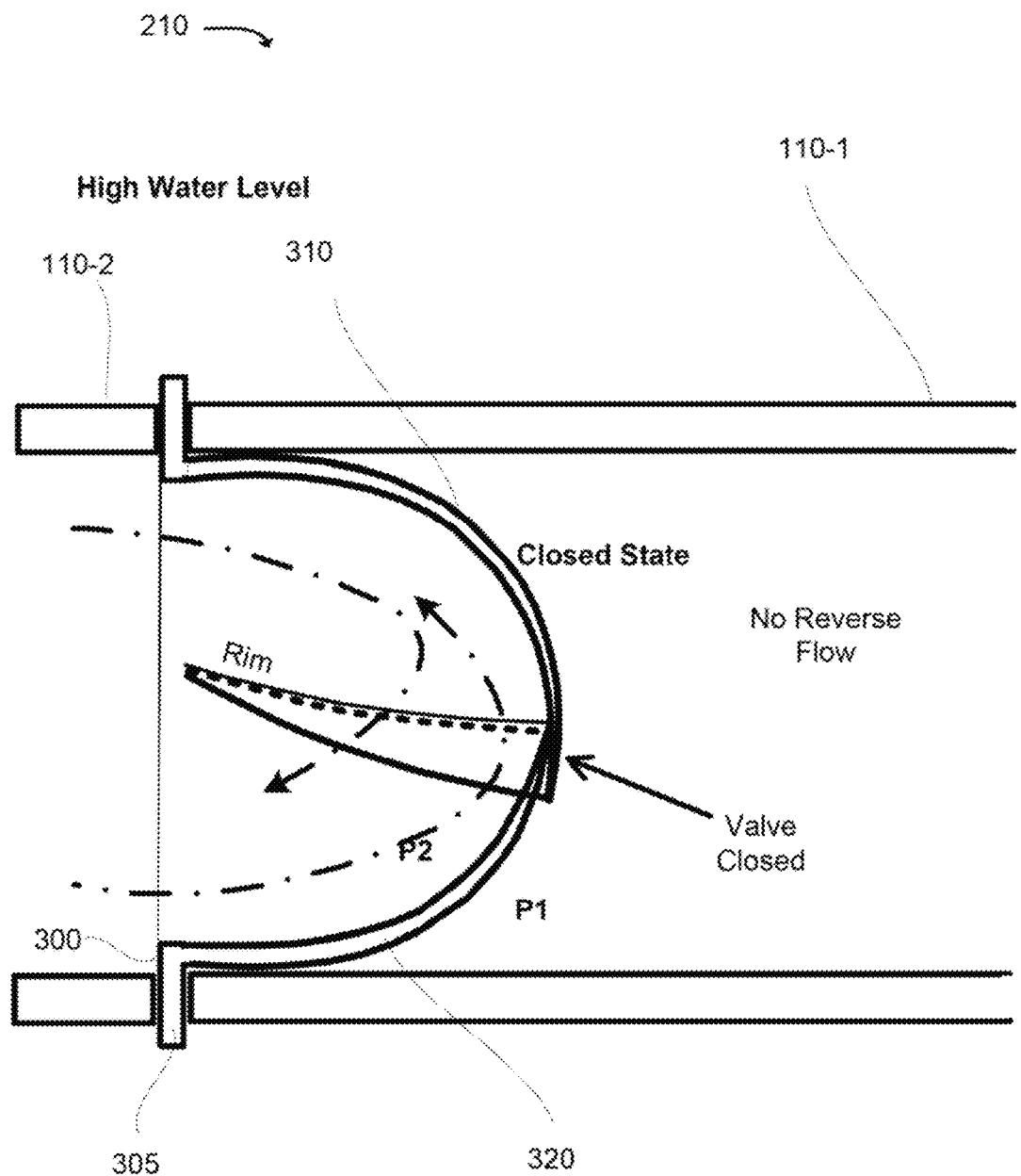
Figure 4C:
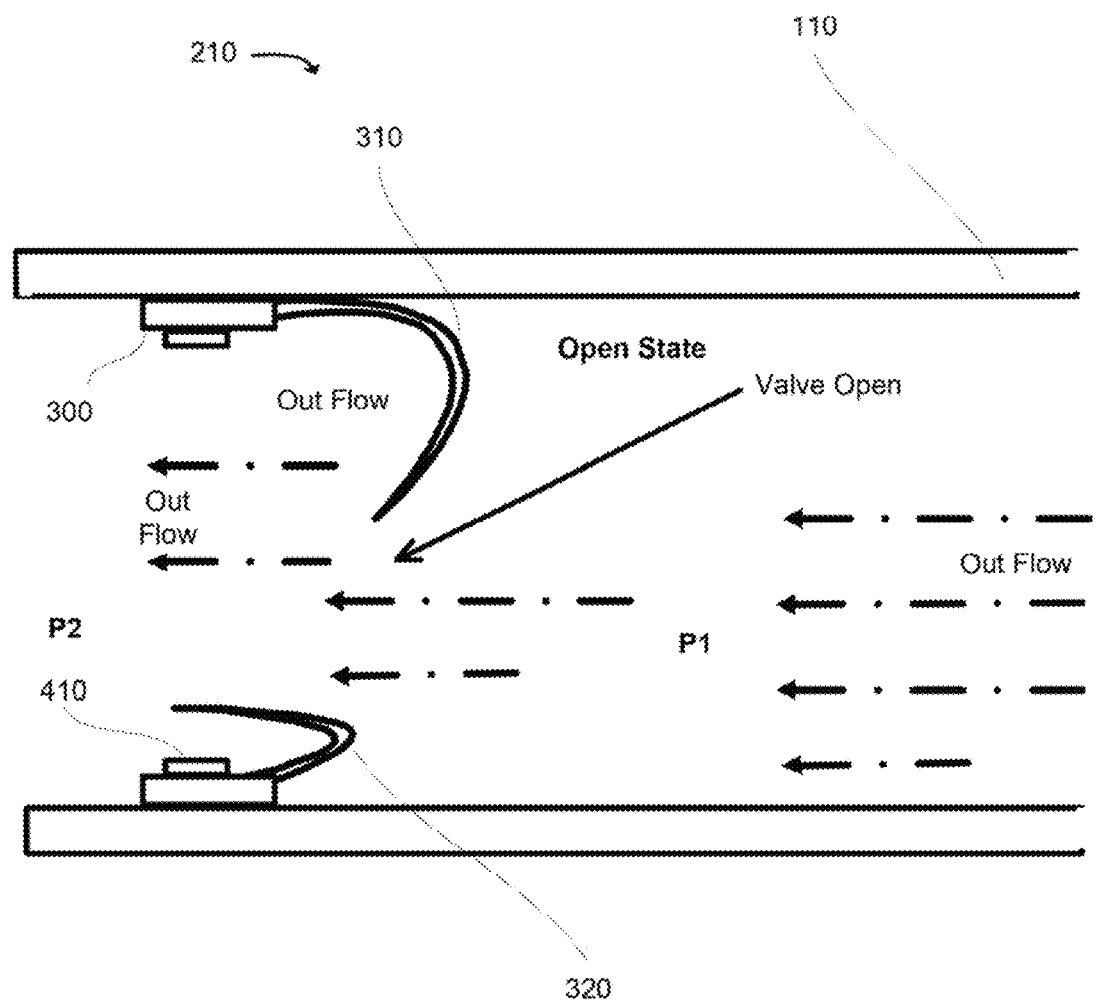

FIGS. 4A through 4C illustrate examples of how valve 210, when used in a stormwater system, may function based on changes in environmental water level. As illustrated in FIG. 4A, valve 210 may be in an open state that allows stormwater (labeled out flow in FIG. 4A) to flow downstream through pipe 110 via valve 210, and to exit pipe 110 into the environmental water. In this example, stormwater flowing through pipe 110 may make contact with and/or impart a force and/or pressure on valve 210. Such force and/or pressure may be due to stationary and/or flowing stormwater within pipe 210 that imparts upstream hydrostatic and/or hydrodynamic forces and/or pressures (hereinafter, "upstream pressure" or "P1") on the upstream side of dome 310 and/or flexible seat 320. Additionally, or alternatively, the environmental water ay be at a low and/or normal level which may impart hydrostatic and/or hydrodynamic forces and/or pressures (hereinafter, "downstream pressure" or "P2") on the downstream side of dome 310 and/or flexible seat 320. When the upstream pressure is greater than the downstream pressure (e.g., P1>P2), the flexible seat 320 may bend, deform, or deflect in a manner that causes a seal to be broken and/or a gap to form between flexible seat 320 and dome 310. Causing the seal to be broken or the gap to form may enable stormwater to flow between edge 329 of flexible seat 320 and dome 310 through pipe 110 into the environmental water via valve 210 when the environmental water is at a low or normal level. As shown in FIG. 4A, valve 210 may be secured inside of pipe 110 using expansion clamp 410. Expansion clamp 410 may correspond to a ring that nests inside of housing 300 and applies an expansion force, such as by adjusting an expansion screw, against housing 300 to secure valve 210 to pipe 110. Expansion clamp 410 may be a separate component from housing 300 and/or may be attached to and/or formed as a part of housing 300. Expansion clamp may be installed in housing 300 and/or on an interior surface of flange (e.g. expansion clamp landing 306), etc.

As illustrated in FIG. 4B, valve 210 (depicted as installed with flange 305 between a first pipe 110-1 and a second pipe 110-2 rather than using an expansion clamp as is in FIGS. 4A and 4C) may be in a dosed state that prevents environmental water from backflowing into pipe 210 and/or a stormwater system with which pipe 210 is associated. In this example, the environmental water may be at a high level which may impart greater hydrostatic and/or hydrodynamic forces and/or pressures P2 on the downstream side of dome 110 and/or flexible seat 320. When the upstream pressure P1 is not greater than the downstream pressure (e.g., P1≤P2), the flexible seat 320 may bend, deform, or deflect in a manner that causes a seal to be formed between flexible seat 320 and dome 310 (e.g., the rim of dome 310). The seal may prevent reverse flow of the environmental water into pipe 210. Preventing such reverse flow may prevent the stormwater system from being inundated with environmental water, overflowing, or flooding the ground in the vicinity of the stormwater system (i.e. preventing environmental water from exiting the stormwater system via storm drains, etc.).

As illustrated in FIG. 4C, valve 210 may be in an open state that allows stormwater (labeled out flow in FIG. 4C) to flow downstream through pipe 110 via valve 210, and to exit pipe 210 into the environmental water. In this example, stormwater flowing through pipe 110 may make contact with and/or impart a force and/or pressure on valve 210. Such force and/or pressure may be due to stationary and/or flowing stormwater within pipe 210 that imparts upstream hydrostatic and/or hydrodynamic forces and/or pressures (hereinafter, "upstream pressure" or "P1") on the upstream side of dome 310 and/or flexible seat 320. Additionally, or alternatively, the environmental water may be at a low and/or normal level which may impart hydrostatic and/or hydrodynamic forces and/or pressures (hereinafter, "downstream pressure" or "P2") on the downstream side of dome 310 and/or flexible seat 320. When the upstream pressure is greater than the downstream pressure (e.g., P1>P2), the flexible seat 320 and dome 310 may bend, deform, or deflect in a manner that causes a seal to be broken and/or a gap to form between flexible seat 320 and dome 310. Unlike FIG. 4A, the dome 310 of FIG. 4C may be flexible to allow dome 310 to enter a dome open position. In FIG. 4A, dome 310 is rigid and remains in the dome closed position. Causing the seal to be broken or the gap to form may enable stormwater to flow between flexible seat 320 and dome 310, through pipe 110 and into the environmental water via valve 210 when the environmental water is at a low or normal level. As shown in FIG. 4C, when both dome 310 and flexible seat 320 deform, more stormwater may be allowed enter the environment by increasing the gap between flexible seat 320 and dome 310 to a larger size (e.g. increased diameter, area, etc.) than when only flexible seat 320 is deformable.

The foregoing description provides illustration and description, but is not intended to be exhaustive or to limit the implementations to the precise form disclosed. Modifications and variations are possible in light of the above teachings or may be acquired from practice of the implementations. It will be apparent that the technologies, as described above, may be implemented using many different forms of components in the implementations described herein and illustrated in the figures. The actual or specialized components and/or materials used to implement the technologies is not limited to the disclosed embodiments. It should be understood that custom and/or off-the-shelf materials may be designed and/or used to implement the technologies based on the description herein.

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are disclosed in the specification, these combinations are not intended to limit the disclosure of the possible implementations intended to be covered by the specification. In fact, many of these features may be combined in ways not specifically recited in the claims and/or disclosed in the specification.

No element, act, or instruction used in the present application should be construed as critical or essential to the implementations unless explicitly described as such. Also, as used herein, the article "a" and "an" are intended t include one or more items and may be used interchangeably with "one" or "more." Where only one item is intended, the term "one" or similar language is used. Further, the phrase "based on" is intended to mean "based, at least in part, on" unless explicitly stated otherwise.

What is claimed is:
1. A flexible check valve that prevents a reverse flow in a fluid-handling system but allows a downstream flow of fluid through the fluid-handling system, the flexible check valve comprising:
   a dome that fits within a pipe of the fluid-handling system and that includes a concave surface;
   a flexible seat that fits within the pipe and that includes a convex surface, the flexible seat being deformable from a closed position, that prevents the reverse flow, to an open position, that allows the downstream flow of fluid through the fluid-handling system, when an upstream pressure in the pipe acts on the flexible seat and exceeds a downstream pressure and when, in the closed position, the concave surface of the dome is oriented downstream and the convex surface of the flexible seat is oriented upstream;
   a housing that is connected to the dome and the flexible seat and that is connectable to the pipe; and
   a seal formable between the concave surf ice of the dome and the convex surface of the flexible seat, the seal being formed when the flexible check valve is in the closed position to prevent the reverse flow.

2. The flexible check valve of claim 1, where the dome is deformable from a dome closed position to a dome open position when the upstream pressure exceeds the downstream pressure.

3. The flexible check valve of claim 1, where the housing further includes a flange.

4. The flexible check valve of claim 1, where the housing further includes art expandable clamp.

5. The flexible check valve of claim 1, where the dome is rigid.

6. The flexible check valve of claim 1, where the dome further includes a rim.

7. The flexible check valve of claim 6, where the rim prevents an edge of the flexible seat from extending beyond the rim.

8. The flexible check valve of claim 1 where the dome includes a second convex surface, opposite the concave surface and the flexible seat includes a second concave surface opposite the convex surface.

9. The flexible check valve of claim 1 where the housing, the dome and the flexible seat are formed from a single piece of material.

10. A flexible check valve that prevents a reverse flow in a fluid-handling system but allows a downstream flow of fluid through the fluid-handling system, the flexible check valve comprising:
   a dome that fits within a pipe of the fluid-handling system and that includes a concave surface and a first base portion;
   a flexible seat that fits within the pipe and that includes a convex surface, the flexible seat being deformable along a flexible gradient from a closed position, that prevents reverse flow, to an open position, that allows the downstream flow of fluid through the fluid-handling system, when an upstream pressure acts on the flexible seat and exceeds a downstream pressure and when, in the closed position, the concave surface of the dome faces downstream and the convex surface of the flexible seat faces upstream,
      the flexible gradient being located between a second base portion and an edge of the flexible seat;
   a housing that fits within the pipe and is connected to the dome proximate the first base portion and the flexible seat proximate the second base portion;
   a seal formable between the concave surface of the dome and the convex surface of the flexible seat, the seal being formed when the flexible check valve is in the closed position to prevent the reverse flow.

11. The flexible check valve of claim 10 where the dome is deformable from a dome closed position to a dome open position when the upstream pressure exceeds the downstream pressure.

12. The flexible check valve of claim 10 where the dome is rigid.

13. The flexible check valve of claim 10 where the flexible seat is more flexible at the edge than at the second base portion.

14. The flexible check valve of claim 10 where the flexible seat is more flexible at the second base portion than at the edge.

15. A flexible check valve that prevents a reverse flow in a stormwater system but allows a drainage of stormwater through the stormwater system, the flexible check valve comprising:
   a dome that fits within a pipe of the stormwater system and that includes a first concave surface, a first convex surface opposite the first concave surface, and a first base portion;
   a flexible seat that fits within the pipe and that includes a second concave surface, a second convex surface opposite the second concave surface, and a second base portion,
      the flexible seat being deformable from a closed position, that prevents reverse flow, to an open position, that allows the drainage of stormwater through the stormwater system, when an upstream pressure in the pipe acts on the second convex surface of the flexible seat and exceeds a downstream pressure and when, in the closed position, the concave surface of the dome is oriented downstream and the convex surface of the flexible seat is oriented upstream;
   a housing that fits within the pipe and is connected to the dome proximate the first base portion and the flexible seat proximate the second base portion;
   a seal formable between overlapping portions, of the first concave surface of the dome and the second convex surface of the flexible seat, the seal being formed when the flexible check valve is in the closed position to prevent the reverse flow.

16. The flexible check valve of claim 15 where the dome is rigid.

17. The flexible check valve of claim 15 where the dome is deformable from a dome closed position to a dome open position when the upstream pressure exceeds the downstream pressure.

18. The flexible check valve of claim 15 where the housing and dome are formed from a single piece of material and the flexible seat is connected to the single piece of material.

19. The flexible check valve of claim 15 where the housing further includes a flange.

20. The flexible check valve of claim 19, where the flange fits within the pipe and includes a landing for an expansion clamp.

* * * * *